US007077350B2

United States Patent
Koelewyn (10) Patent No.: US 7,077,350 B2
(45) Date of Patent: Jul. 18, 2006

(54) MODULAR FLY FISHING REEL

(75) Inventor: Robert W. Koelewyn, Fairfield, CT (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 10/502,488

(22) PCT Filed: Jan. 23, 2003

(86) PCT No.: PCT/US03/02065

§ 371 (c)(1),
(2), (4) Date: Jan. 4, 2005

(87) PCT Pub. No.: WO03/061372

PCT Pub. Date: Jul. 31, 2003

(65) Prior Publication Data

US 2005/0103912 A1      May 19, 2005

Related U.S. Application Data

(60) Provisional application No. 60/396,508, filed on Jul. 16, 2002, provisional application No. 60/352,124, filed on Jan. 24, 2002.

(51) Int. Cl.
*A01K 89/02* (2006.01)
(52) U.S. Cl. ............... 242/295; 242/318; 242/322
(58) Field of Classification Search ............... 242/246, 242/247, 295, 298, 312, 322, 282, 317, 318, 242/303, 307
See application file for complete search history.

(56) References Cited

U.S. PATENT DOCUMENTS

| | | | | |
|---|---|---|---|---|
| 370,684 A * | 9/1887 | Chubb | ......................... | 242/306 |
| 1,761,750 A * | 6/1930 | Schafer | ......................... | 242/321 |
| 3,572,607 A * | 3/1971 | Wilson | ......................... | 242/265 |
| 3,574,339 A * | 4/1971 | Sarah | ......................... | 242/295 |
| 4,515,325 A * | 5/1985 | Ito | ......................... | 242/295 |
| 5,120,003 A | 6/1992 | Sacconi | ......................... | 242/317 |
| 5,590,847 A | 1/1997 | Ament | ......................... | 242/317 |
| 5,626,303 A | 5/1997 | Bringsen | ......................... | 242/265 |
| 5,755,391 A | 5/1998 | Sacconi | ......................... | 242/312 |
| 5,857,632 A | 1/1999 | Arkowski | ......................... | 242/297 |
| 5,918,826 A | 7/1999 | Arkowski | ......................... | 242/295 |

(Continued)

*Primary Examiner*—Kathy Matecki
*Assistant Examiner*—Evan H. Langdon
(74) *Attorney, Agent, or Firm*—Fellers, Snider, Blankenship, Bailey & Tippens, P.C.

(57) ABSTRACT

A modular fly fishing reel includes a frame with a side wall, a generally cylindrical axle cartridge removably mounted in a mounting socket of the frame side wall and also having an outer rotatable axle tube, and a spool having a hub removably secured on the axle tube by a quick release mechanism. The axle cartridge includes a drag assembly adjustable by a drag nut positioned adjacent the frame side wall and acting on the rotatable axle tube and spool. The quick release mechanism includes a detent that is spring biased through the spool hub to engage the axle tube, and releasable by a slide button or push button mounted on a spoke of the spool. The spool has a rim defining a line pocket and the side walls and bottom wall of the line pocket are convex for high strength and low weight.

20 Claims, 6 Drawing Sheets

U.S. PATENT DOCUMENTS

| | | | |
|---|---|---|---|
| 6,382,544 B1 | 5/2002 | Park | 242/303 |
| 6,382,545 B1 | 5/2002 | Yeh | 242/317 |
| 6,412,724 B1 | 7/2002 | Ferrara, Jr. | 242/322 |
| 6,550,709 B1 * | 4/2003 | Vashro | 242/295 |
| 6,601,335 B1 | 8/2003 | Brumfield | 43/25.2 |
| 2001/0038053 A1 * | 11/2001 | Vashro | 242/295 |

* cited by examiner

MODULAR FLY FISHING REEL

PRIORITY

This application claims priority to my U.S. Provisional Application 60/352,124 filed Jan. 24, 2002 and my U.S. Provisional Application 60/396,508 filed Jul. 16, 2002.

FIELD OF THE INVENTION

The invention herein relates to a light weight modular fly fishing reel with an adjustable drag assembly in an axle cartridge, wherein the axle cartridge and spool may each be readily replaced.

BACKGROUND OF INVENTION

Fly fishing is a fine art and fly fisherman want the best possible reel. My U.S. Pat. No. 6,286,772 describes a fly fishing reel with many desirable features, including an adjustable drag, a replaceable spool, and a reversible clutch mechanism. The drag adjustment is made by means of a drag knob, but the drag knob turns with the spool which some users do not find desirable. It is also noted that the drag is adjustable through a range established by the type and number of drag washers and the strength of the spring provided to compress the drag washers. This results in a trade-off between providing a relatively wide range of drag adjustment and providing an extremely precise drag adjustment within a smaller range. However, in order to change the range of the drag adjustment, it would be necessary to at least partially disassemble the reel to provide substitute parts.

As noted above, the spool of the fly fishing reel in my U.S. Pat. No. 6,286,772 is removable for substituting a different spool, with fresh or different line. This is accomplished by removing a nut and sliding the reel from an axle tube. This is a somewhat time-consuming task, at least in the context of desiring the quickest possible spool replacement, and also carries with it the possibility of losing the nut that retains the spool on the reel.

Thus, although my U.S. Pat. No. 6,286,772 provides an excellent fly fishing reel, there remain areas in which improvement would be desirable.

SUMMARY OF INVENTION

It is a principal object of the invention herein to provide an improved fly fishing reel.

It is a further object of the invention herein to provide a fly fishing reel of modular configuration.

It is an additional object of the invention herein to provide an improved fly fishing reel in which the drag mechanism is both easily adjusted and can be readily changed as part of a module.

It is another object of the invention herein to provide a fly fishing reel in which the spool can be quickly and easily replaced.

It is also an object of the invention herein to provide a fly fishing reel that is strong and lightweight, and easy to operate.

In carrying out the invention herein, there is provided a light weight modular fly fishing reel having a frame including a foot adapting the frame for mounting on a fishing rod. An axle cartridge is removably mounted to the frame with a rotatable axle tube of the axle cartridge extending from the frame along an axis thereof. The axle cartridge includes an adjustable drag assembly therein and a drag adjustment knob on one end of the axle cartridge that extends through the frame. A spool is removably mounted to the axle tube.

According to other aspects of the invention, the spool is secured to the axle tube by a quick release mechanism. According to more particular aspects, the quick release mechanism is a slide operated detent that seats in a cooperating groove in the axle tube. According to other more particular aspects of the invention, the quick release mechanism is a push button operated detent that seats in a cooperating groove.

In additional aspects of the invention, the rim of the spool forms an annular fishing line pocket with curved side and bottom walls, the curved side and bottom walls permitting thin walls for low weight while retaining high strength. The walls are preferably convex with respect to the fishing line pocket. Multiple spools with different line capacity are provided.

The invention herein is also carried out by providing the drag assembly including a plurality of drag washers and compression spring means contained in a drag housing, wherein the drag housing is connected with and positioned inside the axle cartridge. The drag housing is fixed with respect to the frame, and has alternate ones of the plurality of drag washers keyed thereto. The other alternate ones of the drag washers are keyed to a clutch shaft extending from the drag housing, which is connected with the axle tube through a one-way clutch so that the drag operates only in one direction of rotation of the spool. The one-way clutch is at the end of the axle cartridge opposite the drag adjustment knob, and is positioned under a removable cover, wherein the one-way clutch can be accessed and reversed with minimal disassembly of the axle cartridge.

Thus, the fly fishing reel according to the invention is provided in three modular parts, including a spool adapted for rapid replacement. The axle cartridge may also be quickly replaced, and it is contemplated that axle cartridges with different ranges of drag force may be provided.

The foregoing and other objects and features of the invention herein will be readily understood by those skilled in the art and will also in part appear in the following detailed description and the claims, taken together with the drawings.

BRIEF DESCRIPTION OF DRAWINGS

The same reference numerals refer to the same elements throughout the various figures.

DESCRIPTION OF PREFERRED EMBODIMENTS

With reference to FIGS. 1–5, a fly fishing reel 10 according to the invention is characterized by modular construction of three main elements; namely, a frame 12, an axle cartridge 14, and a spool 16. These elements are shown assembled as a complete fly fishing reel 10 in FIGS. 1–3, and are shown separated in FIG. 5 to illustrate the modular construction of the fly fishing reel 10 as well as the ease of changing or substituting the modular elements thereof.

Figures 1, 2, 4, 12:
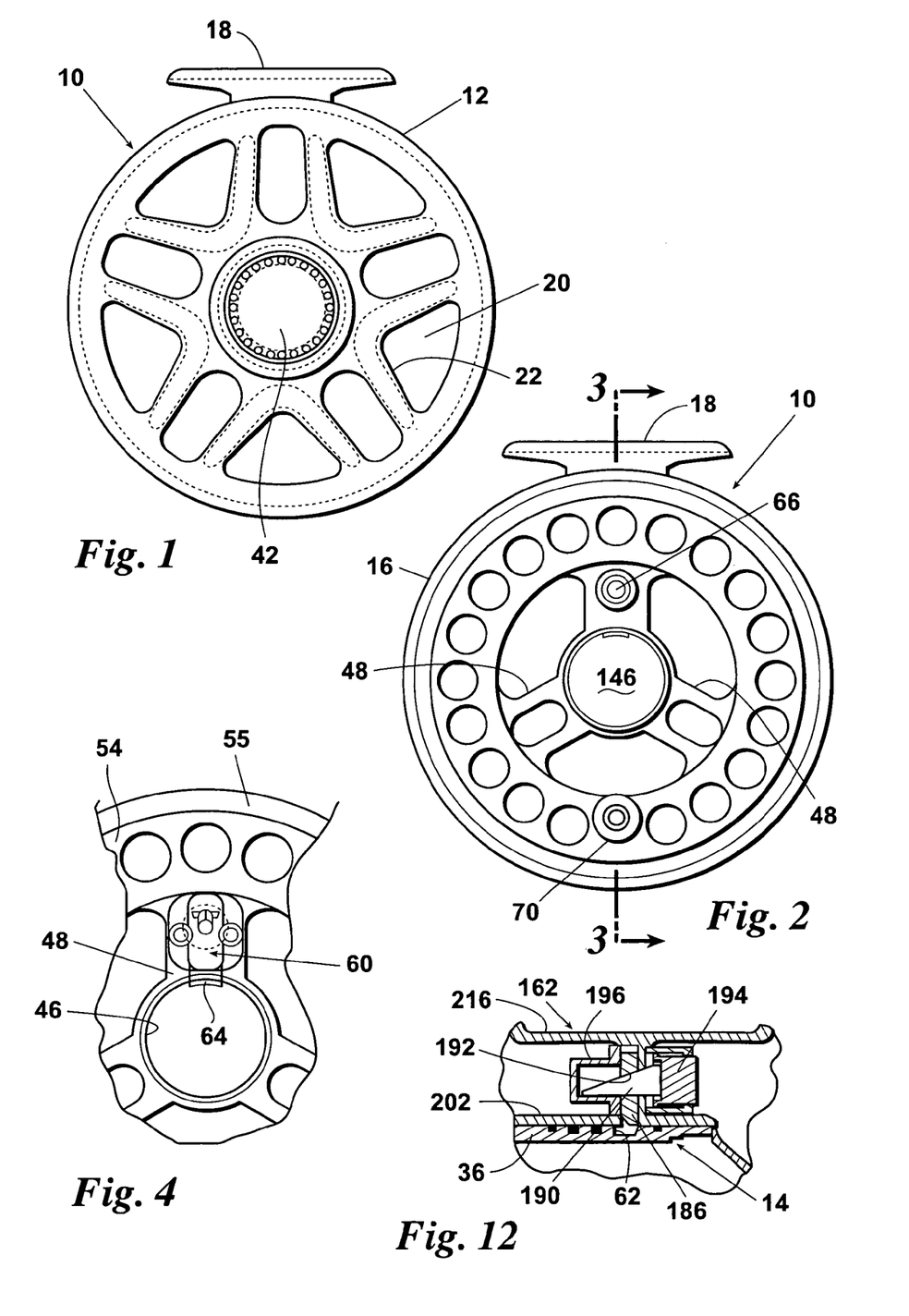
FIG. 1 is a side elevation view of a fly fishing reel according to the invention herein, taken in the direction of the frame side of the reel.
FIG. 2 is a side elevation view of the fly fishing reel of FIG. 1, taken in the direction of the spool side of the reel.
FIG. 4 is an enlarged segmental view of a quick release mechanism securing the spool to the axle cartridge of the fly fishing reel of FIG. 1.
FIG. 12 is an enlarged segment of FIG. 10, shown with the quick release mechanism in a position to release the spool from the axle cartridge.

The frame 12 includes a foot 18 which adapts the fly fishing reel 10 for mounting to a fishing rod, not illustrated. The frame 12 has a curved side wall 20 which may have a series of ribs 22 as shown in FIG. 1, for greater strength with light weight and unique design. A mounting socket 24 is integrally formed with the side wall 20 with its axis generally perpendicularly thereto. The mounting socket 24 is threaded at 25. The side wall has an axially extending line keeper 26 for supporting foot 18 and keeping the line, and another axially extending line keeper 27 at the lower portion of the frame.

The axle cartridge 14 is generally cylindrical, and has an annular mounting surface 28 that is matingly received in the mounting socket 24 of the frame. A mounting ring 30 has an interiorly threaded flange 32 that secures the axle cartridge 14 to the frame 12. The mounting ring 30 is captured on the axle cartridge 14 so that it cannot be separated therefrom during assembly and disassembly of the modular elements.

The axle cartridge 14 has a rotatable axle tube 36 on which the spool 16 is mounted. The axle cartridge contains a drag assembly, generally indicated at 40 in FIG. 3, which has a drag knob 42 on the end thereof that is mounted in the frame 12. The drag knob 42 extends outwardly from the side wall 20 of the frame, so that the drag knob 42 may be manipulated to adjust the drag of the fly fishing reel 10.

The spool 16 of the fly fishing reel 10 has a tubular hub 46, which has a series of spaced-apart teeth 47 on the end adjacent to the frame 12. Spokes 48 radiate outwardly from the tubular hub 46 to a rim 50. The rim 50 has side walls 52, 54 and a bottom wall 56 that form an annular fishing line pocket 58. The side walls 52, 54 and the bottom wall 56 are convex with respect to the annular fishing line pocket 58. This curved convex wall construction achieves greater strength than planar walls, permitting the use of thinner metal to provide a light spool while retaining very high strength. The radius of curvature in the embodiment shown is approximately 6 inches, and may be in a range of about 5 inches to 7 inches or a greater range of 3 inches to 9 inches. The side wall 54 has a palming ring 55 at its outer periphery, for hand checking rotation of the spool. The palming ring defines a groove 57, which receives the line keepers 26, 27.

Figure 3:
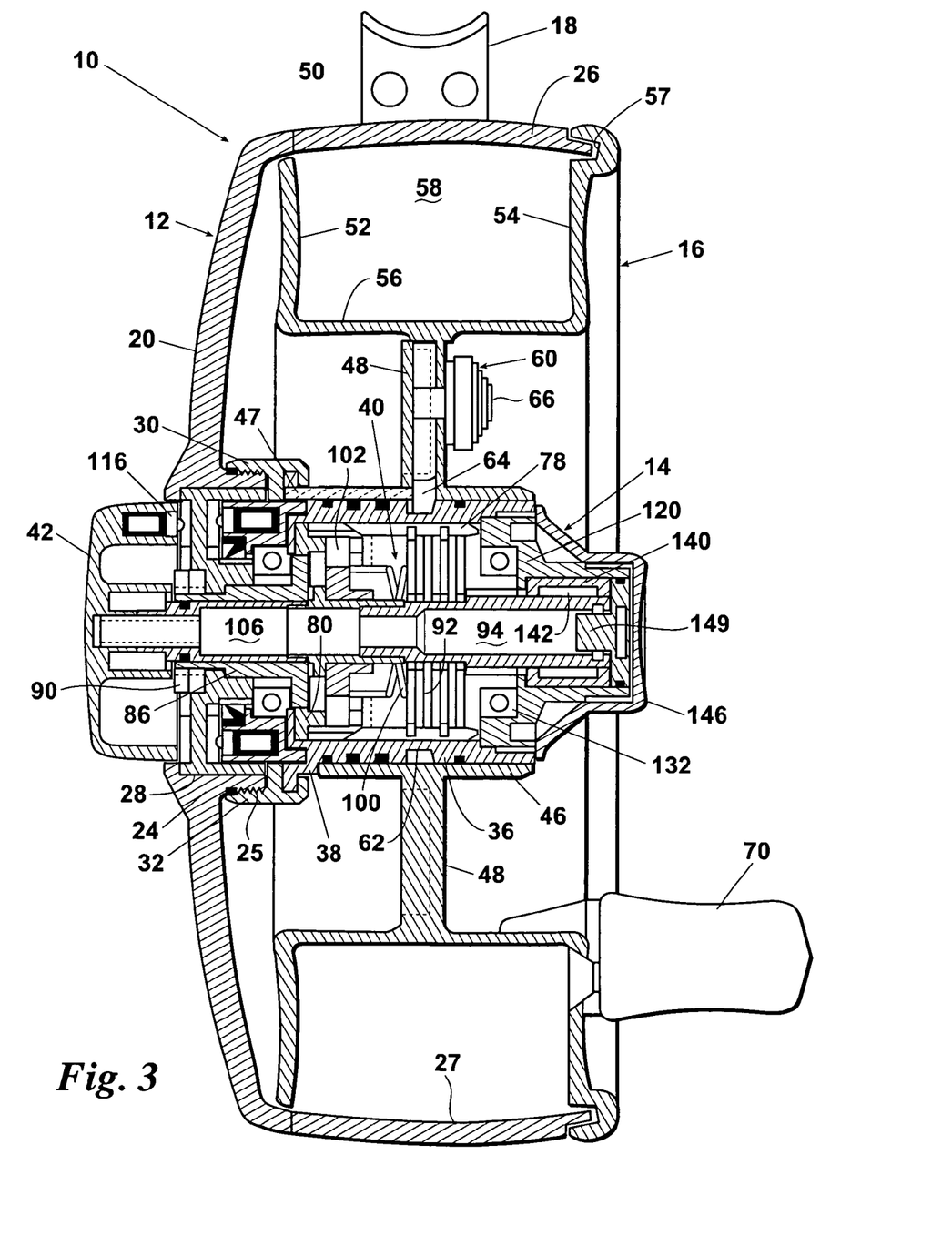
FIG. 3 is a sectional view of the fly fishing reel of FIG. 1, taken along the lines 3—3 of FIG. 2.
Figure 5:
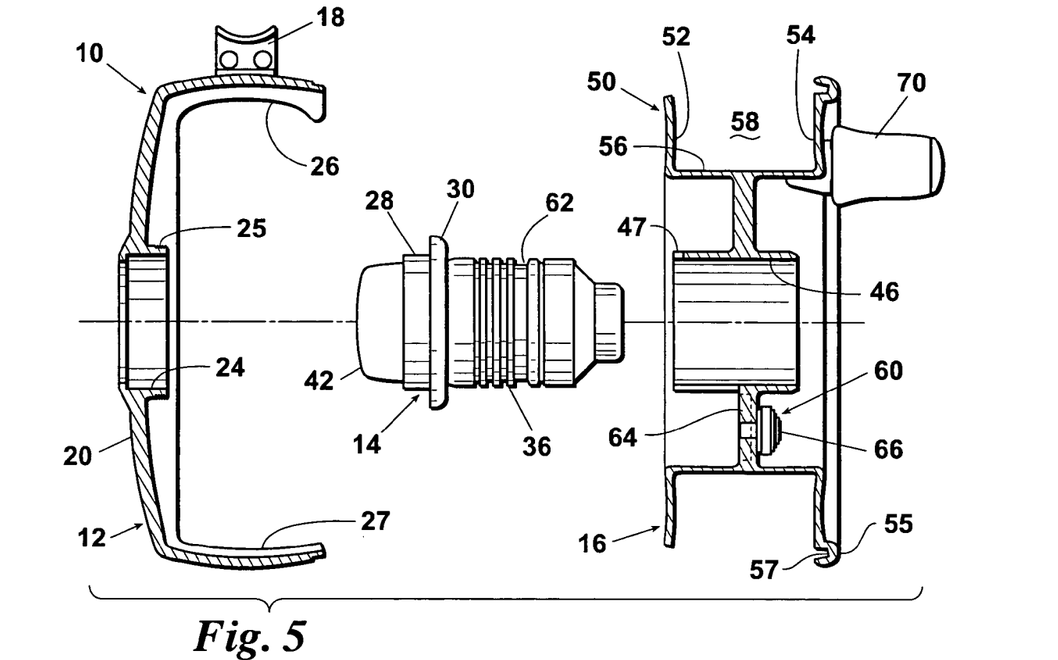
FIG. 5 is an exploded end view of the fly fishing reel of FIG. 1, illustrating the modular construction thereof.
Figure 6:
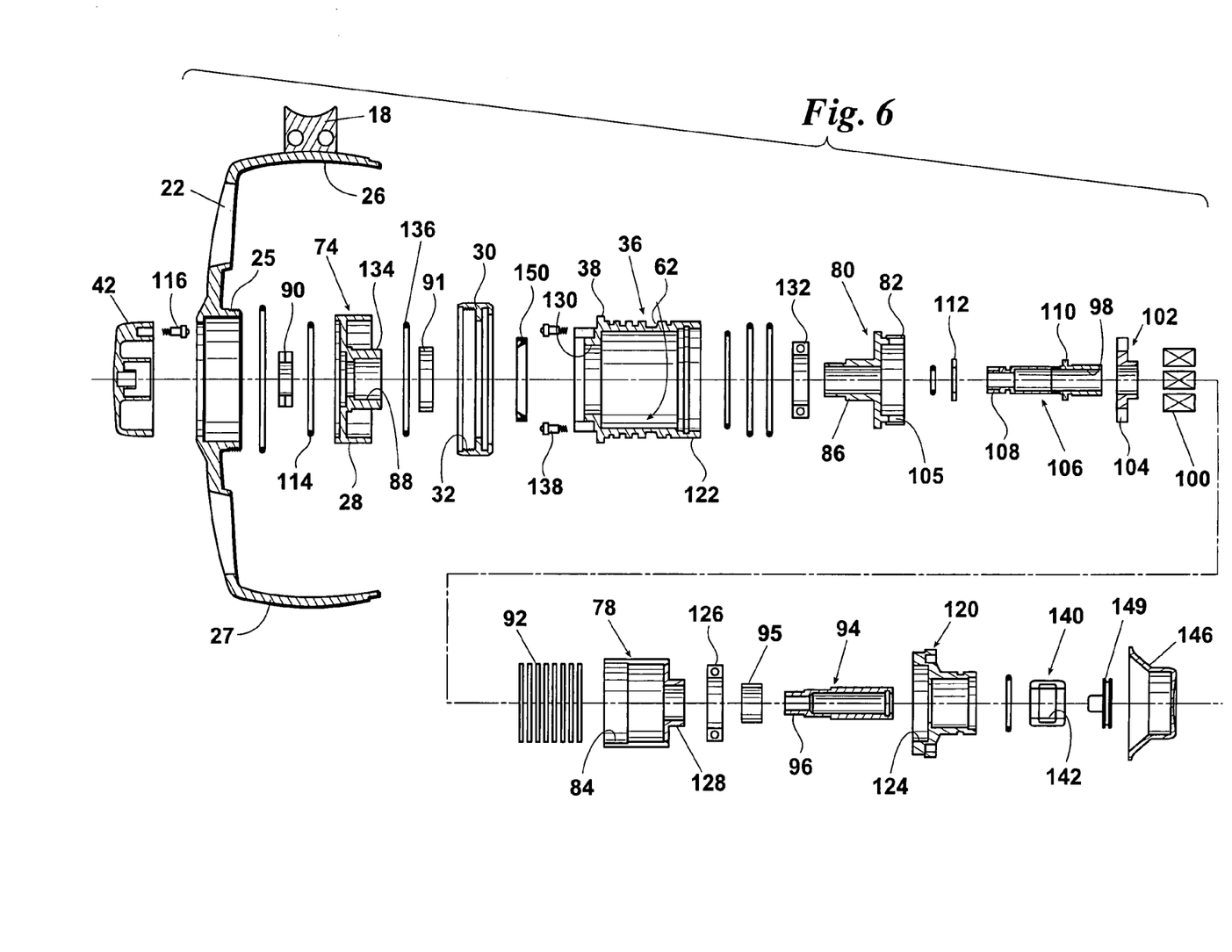
FIG. 6 is an exploded view of the frame and axle cartridge of the fly fishing reel of FIG. 1.
Figure 7:
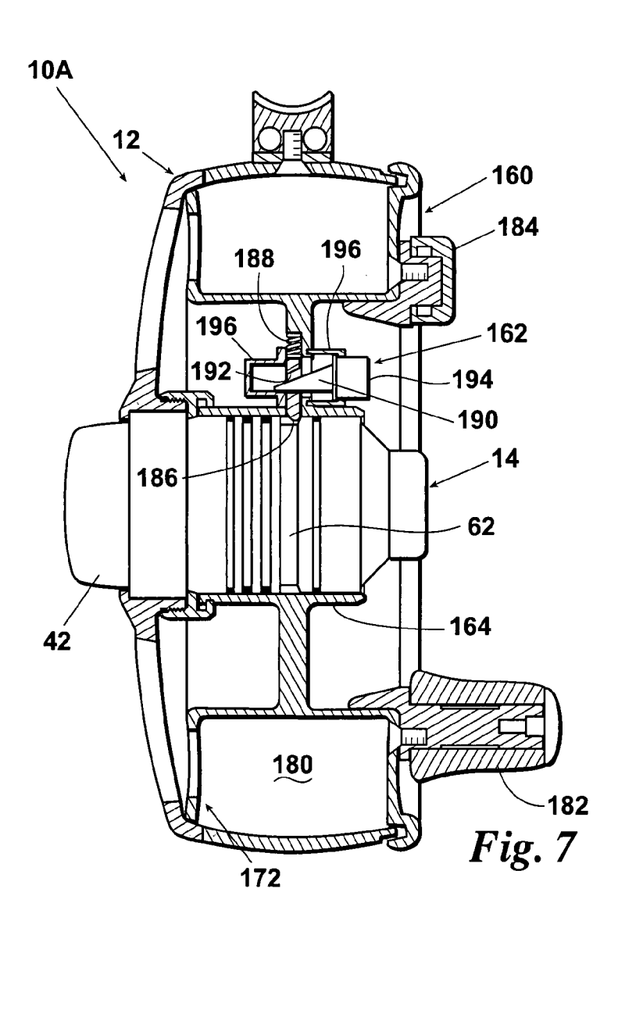
FIG. 7 is an end view, partially in section of another fly fishing reel with a different spool, according to the invention herein.
Figure 8:
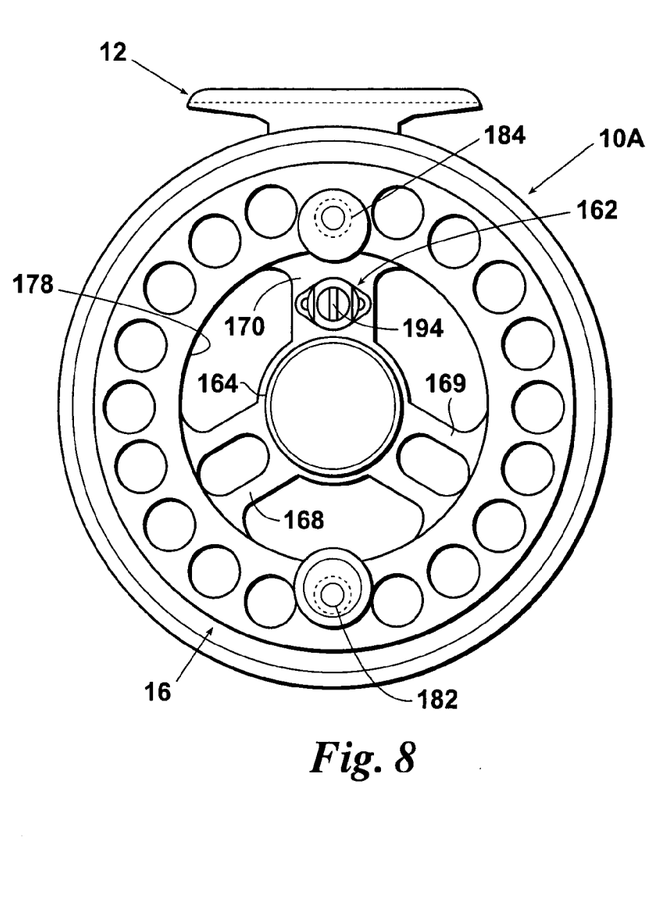
FIG. 8 is a side elevation view of the fly fishing reel of FIG. 7, taken in the direction of the spool side of the reel.

The hub 46 of the spool 16 slides on to the axle tube 36 of the axle cartridge 14. As best seen in FIGS. 3 and 6, the axle tube 36 defines teeth 38 that mesh with the teeth 47 of the spool hub 46, so that the spool 16 and axle tube 36 rotate together. The spool 16 is secured on the axle tube 36 by a quick release mechanism 60. As best seen in FIGS. 3–5, the axle tube 36 is provided with a peripheral groove 62. A series of notches may also be used, if desired. One spoke 48 of the spool 16 has a lubricious plastic detent 64, made of a suitable polymer, that is spring biased through the hub 46 to seat in the groove 62, thereby securing the spool 16 on the axle tube 36 of the cartridge 14. A slide button 66 on the exterior of spoke 48 is connected with the detent 64, so that a simple sliding motion of the slide button 66 along the spoke and against the biasing spring releases the spool. The detent is beveled on its distal end, so that the spool will slide onto the axle tube and click into the groove 62. Thus, the spool 16 may be quickly and easily replaced, and all of the parts necessary to secure the spool 16 on the axle cartridge 14 are self-contained.

The spool 16 also has a handle 70 extending therefrom for rotating the spool 16. The handle is preferably set inwardly from the outer periphery of the spool, so that the distance of user hand travel for one revolution of the spool is diminished and line retrieval can be accomplished at higher speed.

The axle cartridge 14 contains the drag assembly 40 for the fly fishing reel 10, and also provides for rotation of the spool 16 with respect to the frame 12. Parts of the axle cartridge 14 are shown in the exploded view of FIG. 6, and are best seen assembled in the enlarged sectional view of FIG. 3. The axle cartridge has a base 74 which defines the annular mounting surface 28 which is received in the mounting socket 24 of the frame 12. The base 74 mounts a cup-shaped drag housing 78 and its end cover 80, the end cover 80 being secured to the cup-shaped housing by its threaded end 82 received in threads 84 in the side wall of the cup-shaped drag housing. The end cover 80 has a tubular stem 86 that extends through opening 88 in the base 74, and is secured by nut 90. A seal 91 is provided between the base and the end cover 80.

The drag assembly 40 includes plurity of drag washers 92. Alternate ones of the drag washers 92 are keyed to the drag housing 78, so that they cannot rotate with respect to the drag housing 78 and the frame 12 of the reel. The other alternate drag washers are keyed to clutch shaft 94 which rotates with the axle tube 36 and spool 16, as more fully described below. Clutch shaft 94 is supported in bushing 95.

The drag washers 92 are adjustably compressed by drag spring means 100, which in the embodiment shown is six coil springs received in the drag housing 78 between the drag washers 92 and a drag compression nut 102. A single spring surrounding the clutch shaft may also be used. The drag compression nut 102 is keyed for sliding but non-rotational movement in the drag housing 78, the key 104 being visible in FIG. 6 and the slot 105 being provided on the end 82 of the end cover 80. A drag knob shaft 106 is threadably received in the drag compression nut 102, and extends through the stem 86 of the drag housing end cover 80 to a distal end 108. The drag knob 42 is mounted on the distal end 108 for rotating the drag knob shaft, and thereby translating the drag compression nut 102, which tightens or loosens the compression of the drag springs 100, depending on the direction of rotation of the drag knob 42. The drag knob shaft 106 has a flange 110 which positions the drag knob shaft against end cover 80 and a thrust washer 112 adjacent the flange 110 is provided so that the drag knob shaft 106 may rotate freely for drag adjustment. A detent ring 114 is positioned against the base 74 and cooperates with the spring loaded detent assembly 116 to provide a clicking sound upon turning the drag knob 42 for adjustment of the drag. It will be appreciated that other configurations of drag-producing elements may be provided in the drag housing 78.

The axle tube 36 is rotatably mounted surrounding the drag housing 78, as best seen in FIG. 3. An axle tube cover 120 is threaded into the outer end 122 of the axle tube 36, and the axle tube cover defines an annular bearing seat 124. An annular ball bearing assembly 126 has its outer race positioned on the bearing seat 124, and has its inner race received on the stub end 128 of the drag housing 78. This rotatably mounts the outer end of the axle tube 36.

The inner end of the axle tube 36 defines a bearing seat 130, which receives the outside race of ball bearing assembly 132. The inside race of ball bearing assembly 132 is received on the base 74 at 134, thereby rotatably mounting the inside end of the axle tube 36. A second detent ring 136 is mounted in the base 74, and a spring biased detent assembly 138 is mounted with the axle tube 36 to provide a clicling noise upon rotation of the spool 16 in the frame 10.

The axle tube 36 is connected to the clutch shaft 94 by an annular one-way clutch 140. The one-way clutch 140 is secured in the axle tube cover 120 with its one-way roller members 142 surrounding and supporting the clutch shaft 94. The other end 96 of clutch shaft 94 has a stepped-down diameter, and is received in opening 98 of the drag knob shaft 106, which is lubricated and acts as a bushing for rotationally supporting the clutch shaft 94. As described above, the clutch shaft 94 is keyed to alternate ones of the drag washers 92. Therefore, the drag from the plurality of drag washers 92 is applied to the spool 16 through the clutch shaft 94, the axle tube cover 120, and the axle tube 36 to which the spool 16 is mounted. Of course, the action of the one-way clutch 140 causes the drag force to be applied only in the direction of rotation of the spool 16 that releases line.

The axle cartridge 14 has an end cap 146 secured over the axle tube cover 120 and provided with an O-seal 148 and a cap seal member 149, for sealing the outer end of the axle cartridge. This end cap 146 is easily removed to access the one-way clutch 140, which can be reversed for changing the fly fishing reel 10 from right hand to left hand operation. The location of the end cap and one-way clutch provide minimum disassembly for affecting the change. The axle cartridge 14 is further sealed by means of an annular seal 150, seen in FIG. 3, provided between the inner end of the axle tube 36 and the base 74. Various other O-rings are provided, as required and shown in FIGS. 3 and 6. It will be appreciated that the elements and construction of the axle cartridge 14 are well suited for providing an adjustable drag function in a modular cartridge, but that other elements and constructions may also be used for that purpose.

As best seen in FIG. 5, the fly fishing reel is provided in its three modular elements; namely, the frame 12, the axle cartridge 14 and the spool 16. The spool is quickly and easily replaceable, such as for substituting another spool 16 wound with fresh line or different test line. Because of the quick release mechanism 60, there are no parts to handle or drop when changing spools.

The axle cartridge 14 may also be quickly and easily replaced. It is contemplated that for general purpose fly fishing reels, the drag washers 92 and the drag springs 100 will be selected to provide an adjustable drag over a fairly large range, e.g. from 0 lbs. to 20 lbs. or more. However, in some instances of tournament or record-qualifying fishing, it is desirable to have an extremely precise, low-force drag adjustment. Thus, an axle cartridge with super-light drag adjustment, e.g. between 0.1 lbs and 3 lbs., may be provided and easily substituted into the fly fishing reel 10, using the same frame 12 and spool(s) 16. The additional axle cartridge 14 may have the same structure described herein, but would have drag springs 100 of the appropriate spring rate for the desired range of drag, and might have a different number of drag washers 92 or drag washers of a different material or coefficient of friction. These are design choices depending on the desired circumstances of use, wherein no particular specifications are preferred.

FIGS. 7–10 illustrate another fly fishing reel 10A according to the invention. The fly fishing reel 10A has the same frame 12 and axle cartridge 14 as utilized in the fly fishing reel 10 described above, and has a spool 160 characterized by a different quick release mechanism 162.

Figure 9:
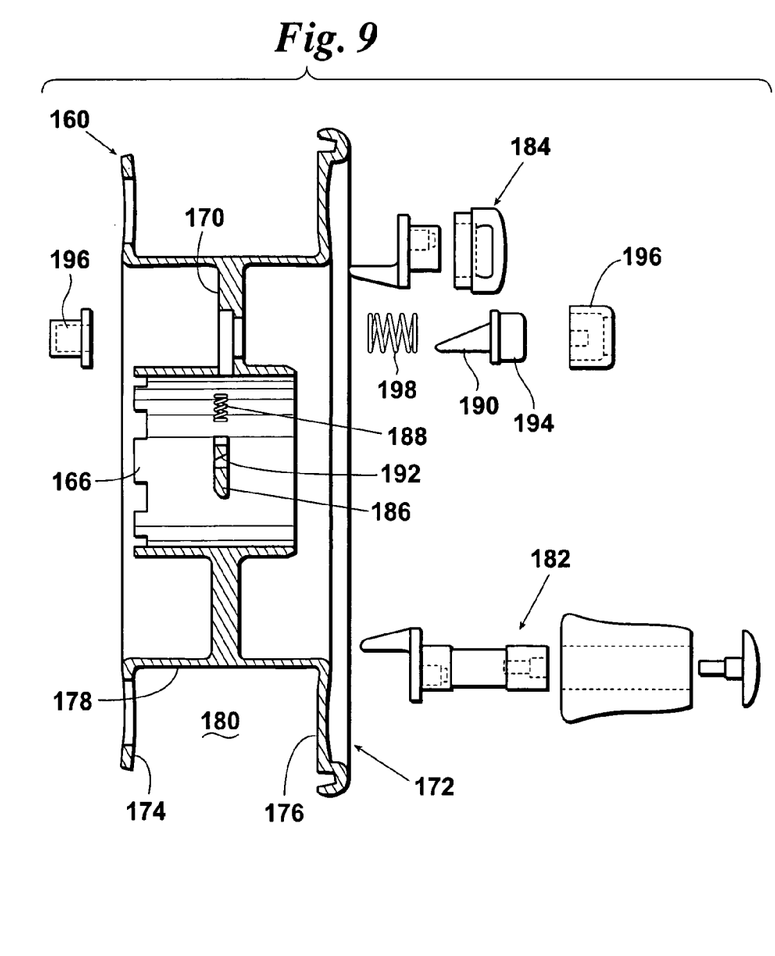
FIG. 9 is an enlarged exploded view of the spool of FIG. 7, showing a quick release mechanism securing the spool to the axle cartridge of the fly fishing reel of FIG. 7.

The spool 160 has a hub 164 including teeth 166 for engaging the spool 160 with the axle tube 36. Spokes 168, 169 and 170 extend radially outwardly from the hub 164 to a rim 172. The rim has first and second sidewalls 174, 176 and a bottom wall 178, defining an annular fishing line pocket 180. The side walls 174, 176 and the bottom wall 178 are preferably convex with respect to the fishing line pocket 180, for high strength and light weight. The spool also has a handle 182 and a counterweight 184.

The spoke 170 mounts the quick release mechanism 162. A plastic detent 186 is radially slidably mounted in the spoke 170 and is biased by spring 188 to protrude through the hub 164 and engage the groove 62 on the axle cartridge 14 for retaining the spool 160 in mounted position. The plastic detent is releasable by a cam 190, which extends through an opening 192 in the detent 186. The cam has a push button 194 mounted on the end thereof, and the push button and cam are mounted to the spoke 170 by means of a two-piece cam housing 196. The cam 190 and push button 194 are spring biased outwardly by a cam spring 198.

To release the spool 160, the cam button 194 is depressed wherein the cam raises the detent 186. This removes the detent from the groove 62 so that the spool 160 is free to slide off the axle cartridge 14. To mount the spool, the button 194 may be depressed to raise the detent so that the spool can be slid onto the axle cartridge 14. It is also possible to mount the spool 160 by pressing the spool onto the axle cartridge 14, which will "cam up" the detent without depressing the push button 194.

Figure 10:
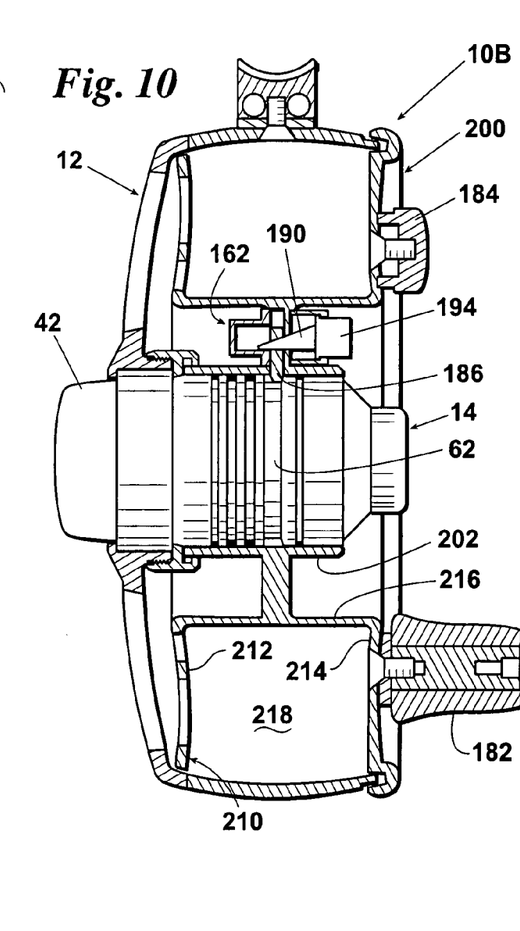
FIG. 10 is an end view, partially in section, of yet another fly fishing reel with a different spool, according to the invention herein.
Figure 11:
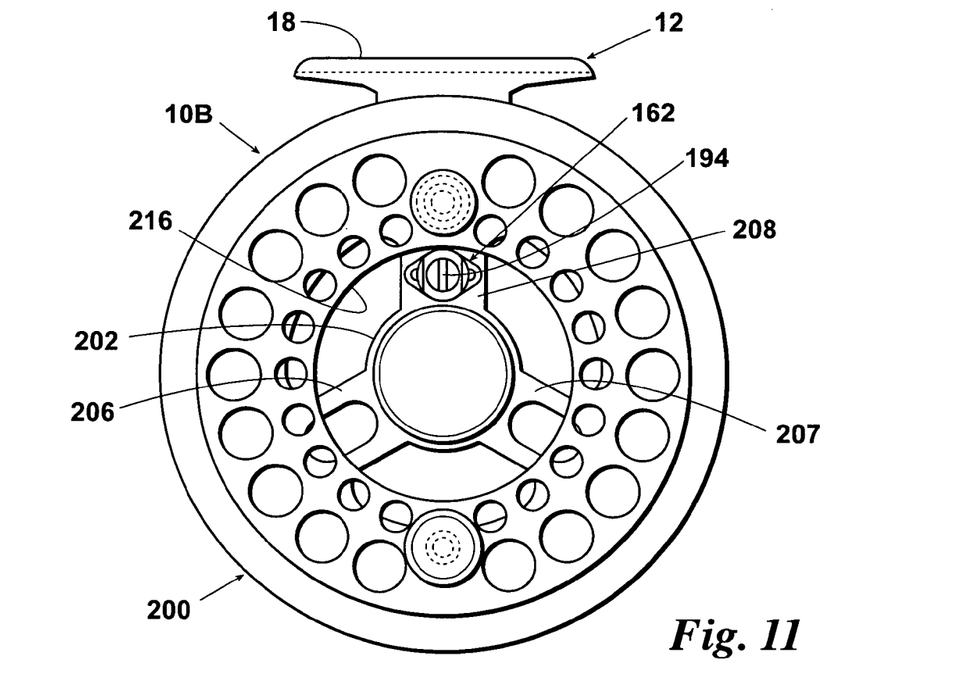
FIG. 11 is a side elevation view of the fly fishing reel of FIG. 10, taken in the direction of the spool side of the reel.

One of the principal advantages of the push button quick release mechanism 162 is illustrated in the fly fishing reel 10B shown in FIGS. 10, 11 and 12. The fly fishing reel 10B also utilizes the frame 12 and axle cartridge 14 described above, but has a different spool 200.

The spool 200 has a hub 202 that fits onto the axle cartridge 14, the hub having teeth for engaging the spool on the axle tube 36. The spool 200 has spokes 206, 207 and 208, which support a rim 210. The rim 210 has convex sidewalls 212, 214 and a bottom wall 216. The sidewalls 212, 214 of the spool 200 are of greater height than the side walls of spool 160, in order to provide additional capacity within the annular fishing line pocket 218. As a result, the spokes 206, 207, 208 are shorter.

As best seen in FIG. 12, the shorter spokes still accommodate the mounting of the push button quick release mechanism 162, which may be operated by depressing push button 194 within the confined space between the hub 202 and the bottom wall 216 of the spool 200. Thus, the push button quick release mechanism 162 offers the opportunity of larger capacity spools and takes full advantage of the quick interchangeability of the spools.

Accordingly, fly fishing reels have been described which fully satisfies the objects of the invention. It will be appreciated that various changes and modifications can be made without departing from the spirit and scope of the invention, which is limited only by the following claims.

I claim:

1. A modular fly fishing reel comprising:
   A) a frame having a foot for mounting onto a fly rod, the frame having a side wall defining a mounting socket;
   B) a generally cylindrical axle cartridge removably mounted in the mounting socket of the frame, the axle cartridge having a drag assembly, the axle cartridge also having an outer rotatable axle tube connected with the drag assembly, and a one-way clutch connecting the drag assembly to the outer rotatable axle tube; and
   C) a spool having a hub removably received and removably secured on the axle tube for rotation therewith.

2. A modular fly fishing reel as defined in claim 1 wherein the drag assembly is adjustable by a drag knob positioned at one end of the axle cartridge.

3. A modular fly fishing reel as defined in claim 2 wherein the drag knob is positioned extending from the side wall of the frame when the axle cartridge is mounted therein.

4. A modular fly fishing reel as defined in cliam 3 wherein the one-way clutch is mounted within the axle cartridge at the end thereof opposite the drag adjustment knob.

5. A modular fly fishing reel as defined in claim 1 wherein the frame defines a socket and threads associated with the socket, and the axle cartridge is received in the socket and threadably secured by means of the threads associated therewith.

6. A modular fly fishing reel as defined in claim 5 wherein the axle cartridge has a mounting ring captured thereon, the mounting ring defining threads for threadably securing the axle cartridge to the threads defined on the frame.

7. A modular fly fishing reel as defined in claim 1 wherein the spool is releasably secured to the outer rotatable axle tube of the axle cartridge by a quick release mechanism.

8. A modular fly fishing reel as defined in claim 7 wherein the quick release mechanism comprises a detent spring biased through the hub to engage the axle tube, and means for manually releasing the detent to remove the spool.

9. A modular fly fishing reel as defined in claim 8 wherein the means for manually releasing the detent is a button slidably mounted with respect to the hub for retracting the detent.

10. A modular fly fishing reel as defined in claim 9 wherein the spool has a rim defining a line pocket and at least one spoke extending from the hub to the rim, and the detent and slide button are mounted to a spoke wherein generally radial sliding motion of the button with respect to the hub retracts the detent.

11. A modular fly fishing reel as defined in claim 8 wherein the means for manually releasing the detent comprises a push button.

12. A modular fly fishing reel as defined in claim 11 wherein the spool has a rim defining a line pocket and at least one spoke extending from the hub to the rim, and the detent and push button are mounted to the spoke, the push button comprising a cam for retracting the detent by cam action.

13. A modular fly fishing reel as defined in claim 8 wherein the detent is fabricated of a polymer.

14. A modular fly fishing reel as defined in claim 1 wherein the spool has a rim with side walls and bottom walls defining a line pocket.

15. A modular fly fishing reel as defined in claim 14 wherein the rim side walls are curved along a radius of the spool.

16. A modular fly fishing reel as defined in claim 15 wherein the rim side walls are convex with respect to the line pocket.

17. A modular fly fishing reel as defined in claim 16 wherein the curvature of the rim side walls has a radius in the range of 3 inches to 9 inches.

18. A modular fly fishing reel as defined in claim 17 wherein the curvature of the rim side walls has a radius in the range of 5 inches to 7 inches.

19. A modular fly fishing reel as defined in claim 15 wherein the bottom wall defining the line pocket is curved.

20. A modular fly fishing reel as defined in claim 19 wherein the bottom wall is convex with respect to the line pocket.

* * * * *